(12) United States Patent
Pelly et al.

(10) Patent No.: US 7,302,577 B2
(45) Date of Patent: Nov. 27, 2007

(54) DATA PROCESSING APPARATUS AND METHOD

(75) Inventors: Jason Charles Pelly, Reading (GB); Daniel Warren Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 785 days.

(21) Appl. No.: 10/317,533

(22) Filed: Dec. 12, 2002

(65) Prior Publication Data

US 2003/0188166 A1 Oct. 2, 2003

(30) Foreign Application Priority Data

Dec. 13, 2001 (GB) ............................. 0129865.2

(51) Int. Cl.
*H04L 9/00* (2006.01)
*H04K 1/00* (2006.01)

(52) U.S. Cl. ..................... 713/176; 382/100; 380/54

(58) Field of Classification Search ............ None
See application file for complete search history.

(56) References Cited

U.S. PATENT DOCUMENTS 5,664,018 A 9/1997 Leighton
5,949,885 A * 9/1999 Leighton .................. 380/54

(Continued)

FOREIGN PATENT DOCUMENTS

EP 0 951 183 10/1999

(Continued)

OTHER PUBLICATIONS

Cox, I. J.; Kilian, J.; Leighton, F.T.; Shamoon, T., Secure Spread Spectrum Watermarking for Multimedia, Dec. 1997, Image Processing, IEEE Transaction on, vol. 6, Issue 12, pp. 1673-1687.*

(Continued)

*Primary Examiner*—Christopher Revak
*Assistant Examiner*—Arezoo Sherkat
(74) *Attorney, Agent, or Firm*—Oblon, Spivak, McClelland, Maier & Neustadt, P.C.

(57) ABSTRACT

A watermarking system comprises an encoding data processor operable to generate at least one marked version of an original item of material by introducing one of a predetermined set of code words into a copy of the original material item. The encoding processor comprises a code word generator operable to form the code word by generating a plurality of code word coefficients, and an encoder operable to combine the code word coefficients with the material item, and an adaptation processor. The adaptation processor is operable to adapt the strength of the code word coefficients or the material item samples in accordance with a relative sensitivity of the material item samples to carry the code word coefficients. The strength of the watermark is therefore adapted in accordance with the sensitivity of the material item to carry watermark code word coefficients. As a result there is a reduced likelihood of an attacker identifying parts of the material item to which the watermark code word has been added. A likelihood of a successful attack is thereby reduced whilst maintaining a desired false negative detection probability.

The watermarking system finds particular application in identifying a point of distribution of pirate copies of video material generated by capturing the watermarked image, using, for example, a camcorder in a cinema.

24 Claims, 9 Drawing Sheets

U.S. PATENT DOCUMENTS

| | | | | |
|---|---|---|---|---|
| 6,104,826 | A * | 8/2000 | Nakagawa et al. | 382/100 |
| 6,385,329 | B1 * | 5/2002 | Sharma et al. | 382/100 |
| 6,424,725 | B1 * | 7/2002 | Rhoads et al. | 382/100 |
| 6,738,493 | B1 * | 5/2004 | Cox et al. | 382/100 |
| 6,839,673 | B1 * | 1/2005 | Choi et al. | 704/273 |
| 2002/0037091 | A1 * | 3/2002 | Terasaki | 382/100 |
| 2003/0099355 | A1 * | 5/2003 | Moroney | 380/210 |
| 2003/0115052 | A1 * | 6/2003 | Chen et al. | 704/230 |
| 2005/0108541 | A1 * | 5/2005 | Yacobi et al. | 713/176 |

FOREIGN PATENT DOCUMENTS

| | | |
|---|---|---|
| GB | 2 351 409 | 12/2000 |
| WO | WO 96/36163 | 11/1996 |
| WO | WO 99/60792 | 11/1999 |

OTHER PUBLICATIONS

Wang, Q.; Shenghe, S., DCT-Based Image-Independent Digital Watermarking, 21-25, Signal Precessing Proceedings, 2000. WCCC-ICSP 2000, 5th International Conference on, vol. 2, pp. 942-945.*

* cited by examiner

DATA PROCESSING APPARATUS AND METHOD

FIELD OF INVENTION

The present invention relates to encoding data processing apparatus and methods, which are arranged to embed code words into versions of material items. In some applications the code words are used to uniquely identify the material items.

Correspondingly, the present invention also relates to data processing apparatus and methods operable to detect one or more code words, which may be present in a material item.

BACKGROUND OF THE INVENTION

A process in which information is embedded in material for the purpose of identifying the material is referred to as watermarking.

Identification code words are applied to versions of material items for the purpose of identifying the version of the material item. Watermarking can provide, therefore, a facility for identifying a recipient of a particular version of the material. As such, if the material is copied or used in a way, which is inconsistent with the wishes of the distributor of the material, the distributor can identify the material version from the identification code word and take appropriate action.

In this description, an item of material, which is copied or used in a way, which is inconsistent with the wishes of the originator, owner, creator or distributor of the material, will be referred to for convenience as an offending item of material or offending material.

The material could be any of video, audio, audio/video material, software programs, digital documents or any type of information bearing material.

For a watermarking scheme to be successful, it should be as difficult as possible for the users to collude in order to mask or remove the identification code words. It should also be as difficult as possible for users to collude to alter the identification code word to the effect that one of the other users is falsely indicated as the perpetrator of an offending item of material. Such an attempt by users to collude to either mask the code word or alter the code word to indicate another user is known as a collusion attack.

Any watermarking scheme should be arranged to make it difficult for users receiving copies of the same material to launch a successful collusion attack. A watermarking scheme should therefore with high probability identify a marked material item, which has been the subject of a collusion attack. This is achieved by identifying a code word recovered from the offending material. Conversely, there should be a low probability of not detecting a code word when a code word is present (false negative probability). In addition the probability of falsely detecting a user as guilty of taking part in a collusion attack, when this user has not taken part, should be as low as possible (false positive probability).

U.S. Pat. Ser. No. 5,664,018 discloses a watermarking process in which a plurality of copies of material items are marked with a digital watermark formed from a code word having a predetermined number of coefficients. The watermarked material item is for example an image. The apparatus for introducing the watermark transforms the image into the Discrete Cosine Transform (DCT) domain. The digital watermark is formed from a set of randomly distributed coefficients having a normal distribution. In the DCT domain each code word coefficient is added to a corresponding one of the DCT coefficients. The watermarked image is formed by performing an inverse DCT. A related publication entitled "Resistance of Digital Watermarks to Collusion Attacks", by J. Kilian, F. T. Leighton et al, published by MIT, Jul. 27, 1998, provides a detailed mathematical analysis of this watermarking process to prove its resistance to attack.

SUMMARY OF THE INVENTION

According to an aspect of the present invention there is provided an encoding data processing apparatus for generating at least one marked copy of an original item of material by introducing one of a predetermined set of code words into a copy of the material item. The code word comprises a plurality of coefficients formed from pseudo-randomly or randomly distributed numbers. The apparatus comprises a code word generator operable to provide the code word, and an encoder processor operable to combine the code word coefficients with the material item, and an adaptation processor. The adaptation processor is operable to adapt one of the strength of the code word coefficients or the material item samples in accordance with a relative sensitivity of the material item samples to carry the code word coefficients.

An object of the present invention is to provide a practical watermarking system, which utilises code words having coefficients which are randomly distributed as proposed as in U.S. Pat. No. 5,664,018.

Another object of the present invention is to introduce watermark code words into material items in accordance with a relative sensitivity of the material items to carry the watermark.

As will be understood from the explanation above, preferably the watermark should not be perceivable to an observer of, for example, a material item such as an image. If the watermark is perceivable then an attacker may more easily identify parts of an image which carry watermark code word coefficients. However, in order to improve a likelihood of being able to detect the code word, the strength of the code word coefficients should be as high as possible, reducing the false negative detection probability. A higher watermark strength will increase the likelihood of the watermark being perceptible in the material item.

Embodiments of the present invention aim to adapt a strength of the watermark in accordance with the sensitivity of the material item to carry watermark code word coefficients. It has been observed that properties of parts of the material item can make these parts more or less able to carry code word coefficients. An adaptation processor is provided for adapting the strength of the watermark code word added to an image in accordance with a relative ability of the image samples to carry the code word coefficients. As a result a likelihood of detecting a watermark code word from the image is improved. Conversely the strength of the watermark code words can be adapted to a minimum to reduce a likelihood of the watermark code words being perceived in the marked image copy whilst maintaining a predetermined false negative detection probability.

One example of a relative sensitive of a material item to carry code word coefficients is the magnitude of the samples of the material item samples. Accordingly, in one embodiment the adaptation processor is operable to determine the sensitivity of the material item in accordance with a relative magnitude of the material item samples. The adaptation processor may therefore be arranged to increase the strength of the watermark code word coefficients in proportion with the relative magnitude of the material item samples. To this end the adaptation processor may comprise a pre-processor operable to adapt the magnitude of the material item samples in accordance with a mapping function, and a post-processor coupled to the encoder and operable to adapt the magnitude of the material item samples in accordance with an inverse mapping function. The inverse mapping function is complementary to the mapping function performed by the post-processor. The mapping function provides a non-linear relationship between the magnitude of the material signal samples input and the adapted magnitude of the material signal samples output.

In another embodiment of the invention the relative sensitivity is determined in accordance with a relative standard deviation of the magnitude of the material item samples. In material items such as images, parts of the image having samples with a greater standard deviation can more easily conceal code word coefficients than parts with a low standard deviation. In such embodiments the adaptation processor is operable to increase the strength of the watermark code word coefficients in proportion with the relative standard deviation of the magnitude of the material item samples. To this end the adaptation processor may comprise a pre-processor operable to generate a mapping value bounded by a predetermined range, which is inversely proportional to the relative standard deviation of the magnitude of the material item samples, and to adapt the signal samples by dividing the signal samples by the mapping value. A post-processor is coupled to the encoder and is operable to adapt the magnitude of the material item samples by scaling the encoded signal samples by the mapping value.

The material item may be for example an image. In some embodiments the image may be divided into blocks of a predetermined size. For each block the standard deviation is determined for the rows of samples of the block and the columns of samples of the block. The lowest of these standard deviations is selected as the relative standard deviation for the block. The mapping value is then determined on a block by block basis in accordance with the relative standard deviation determined for each block.

In another alternative embodiment, a scaling factor is calculated for the material item, which is proportional to the standard deviation of the material item.

According to another aspect of the present invention there is provided a detecting data processing apparatus operable to identify at least one of a plurality of code words present in a marked version of a material item. The detecting data processing apparatus comprises a decoding processor operable to generate a recovered code word from the marked material item, and a detection processor. The detection processor is operable to generate a correlation value for each code word in the set by correlating the recovered code word with respect to each regenerated code word of the set. The detection processor is operable to detect at least one code word for the correlation value of the regenerated code word exceeding a predetermined correlation threshold. The variance of the values of the regenerated code word coefficients is arranged to be substantially unity.

It has been discovered that setting the variance of the regenerated code words to unity provides a correlation result for the recovered and regenerated code words which permits the presence of a code word to be detected from a marked material item. As a result it is not necessary to communicate the watermark strength used in the encoding data processing apparatus to the detecting apparatus.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which.

DESCRIPTION OF PREFERRED EMBODIMENTS

Watermarking System Overview

An example embodiment of the present invention will now be described with reference to protecting video images. The number of users to which the video images are to be distributed determines the number of copies. To each copy an identification code word is added which identifies the copy assigned to one of the users.

Video images are one example of material, which can be protected by embedding a digital code word. Other examples of material, which can be protected by embedding a code word, include software programs, digital documents, music, audio signals and any other information-bearing signal.

Figure 1:
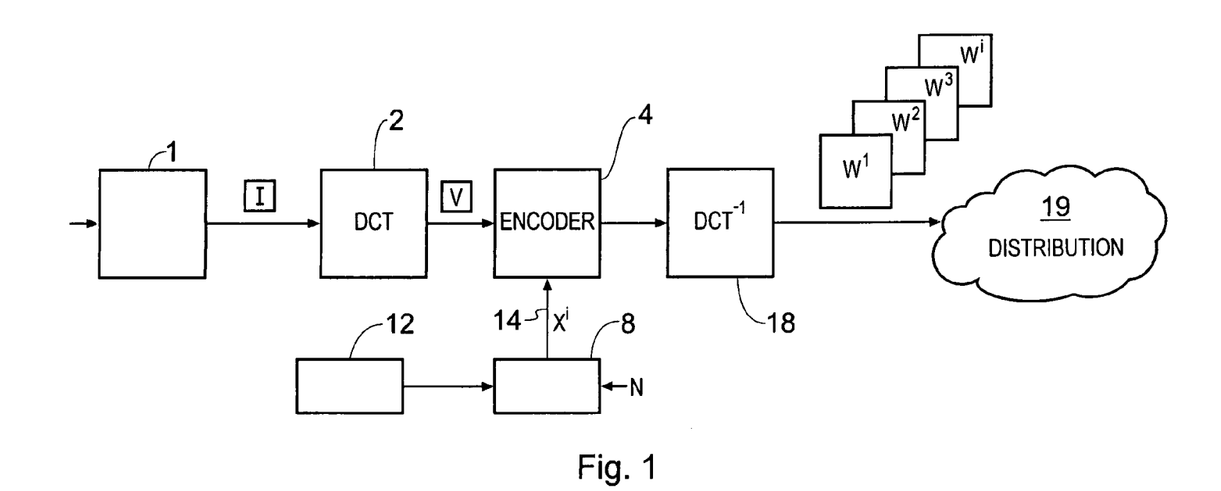
FIG. 1 is a schematic block diagram of an encoding image processing apparatus.

An example of an encoding image processing apparatus, which is arranged to introduce an identification code word into a copy of an original image, is shown in FIG. 1. An original image I is received from a source and stored in a frame store 1. This original image is to be reproduced as a plurality of water marked copies, each of which is marked with a uniquely identifiable code word. The original image is passed to a Discrete Cosine Transform (DCT) processor 2, which divides the image into 8×8 pixel blocks and forms a DCT of each of the 8×8 pixel blocks. The DCT processor 2 therefore forms a DCT transformed image V.

In the following description the term "samples" will be used to refer to discrete samples from which an image (or indeed any other type of material) is comprised. The samples may be luminance samples of the image, which is otherwise, produce from the image pixels. Therefore, where appropriate the terms samples and pixels are inter-changeable.

The DCT image V is fed to an encoding processor 4. The encoding processor 4 also receives identification code words from an identification code word generator 8.

The code word generator 8 is provided with a plurality of seeds, each seed being used to generate one of the corresponding code words. Each of the generated code words may be embedded in a copy of the original image to form a watermarked image. The code word generator 8 is provided with a pseudo random number generator. The pseudo random number generator produces the code word coefficients to form a particular code word. In preferred embodiments the coefficients of the code words are generated in accordance with a normal distribution. However, the coefficients of the code word are otherwise predetermined in accordance with the seed, which is used to initialise the random number generator. Thus for each code word there is a corresponding seed which is store in a data store 12. Therefore it will be understood that to generate the code word $X^i$, $seed_j$ is retrieved from memory 12 and used to initialise the random number generator within the code word generator 8.

In the following description the DCT version of the original image is represented as V, where;

$$V=\{v_i\}=\{v_1, v_2, v_3, v_4, \ldots v_N\}$$

and $v_i$ are the DCT coefficients of the image. In other embodiments the samples of the image $v_i$ could represent samples of the image in the spatial domain or in an alternative domain.

Each of the code words $X^i$ comprises a plurality of n code word coefficients, where;

$$X^i=\{x_j^i\}=\{x_1^i, x_2^i, x_3^i, x_4^i, \ldots x_n^i\}$$

The number of code word coefficients n corresponds to the number or samples of the original image V. However, a different number of coefficients is possible, and will be set in dependence upon a particular application.

A vector of code word coefficients $X^i$ forming the i-th code word is then passed via channel 14 to the encoder 4. The encoder 4 is arranged to form a watermarked image $W^i$ by adding the code word $X^i$ to the image V. Effectively, therefore, as represented in the equation below, each of the code word coefficients is added to a different one of the coefficients of the image to form the watermark image $W^i$.

$$W^i=V+X^i$$

$$W^i=v_1+x_1^i, v_2+x_2^i, v_3+x_3^i, v_4+x_4^i, \ldots, v_n+x_n^i$$

As shown in FIG. 1, the watermarked images $W^i$ are formed at the output of the image processing apparatus by an forming inverse DCT of the image produced at the output of the encoding processor 4 by the inverse DCT processor 18.

Therefore as represented in FIG. 1 at the output of the encoder 4 a set of the watermarked images can be produced. For a data word of up to 20-bits, one of 10,000,000 code words can be selected to generate 10 million watermarked $W^j$ versions of the original image I.

Although the code word provides the facility for uniquely identifying a marked copy $W^i$ of the image I, in other embodiments the 20 bits can provide a facility for communicating data within the image. As will be appreciated therefore, the 20 bits used to select the identification code word can provide a 20 bit pay-load for communicating data within the image V.

The encoding image processing apparatus which is arranged to produce the watermarked images shown in FIG. 1 may be incorporated into a variety of products for different scenarios in which embodiments of the present invention find application. For example, the encoding image processing apparatus may be connected to a web site or web server from which the watermarked images may be downloaded. Before downloading a copy of the image, a unique code word is introduced into the downloaded image, which can be used to detect the recipient of the downloaded image at some later point in time.

In another application the encoding image processor forms part of a digital cinema projector in which the identification code word is added during projection of the image at, for example, a cinema. Thus, the code word is arranged to identify the projector and the cinema at which the images are being reproduced. Accordingly, the identification code word can be identified within a pirate copy produced from the images projected by the cinema projector in order to identify the projector and the cinema from which pirate copies were produced. Correspondingly, a watermarked image may be reproduced as a photograph or printout in which a reproduction or copy may be made and distributed. Generally therefore, the distribution of the watermarked images produced by the encoding image processing apparatus shown in FIG. 1 is represented by a distribution cloud 19.

Detecting Processor

Figure 2:
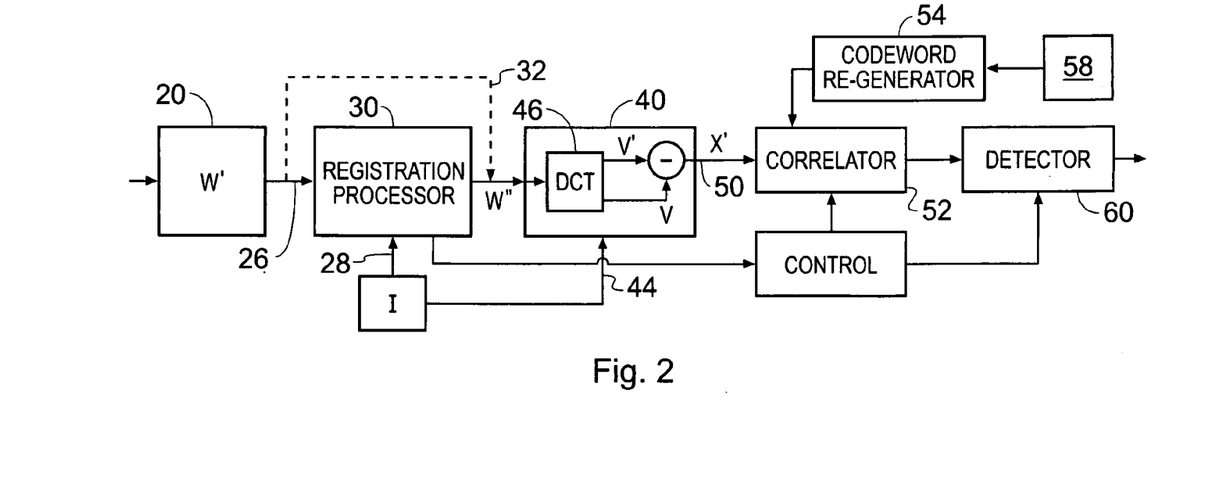
FIG. 2 is a schematic block diagram of a detecting image processing apparatus.

A detecting image processing apparatus which is arranged to detect one or more of the code words, which may be present in an offending marked image is shown in FIG. 2. Generally, the image processor shown in FIG. 2 operates to identify one or more of the code words, which may be present in an offending copy of the image.

The offending version of the watermarked image W' is received from a source and stored in a frame store 20. Also stored in the frame store 20 is the original version of the image I, since the detection process performed by the image processor requires the original version of the image. The offending watermarked image W' and the original version of the image are then fed via connecting channels 26, 28 to a registration processor 30.

As already explained, the offending version of the image W' may have been produced by photographing or otherwise reproducing a part of the watermarked image $W^i$. As such, in order to improve the likelihood of detecting the identification code word, the registration processor 30 is arranged to substantially align the offending image with the original version of the image present in the data store 20. The purpose of this alignment is to provide a correspondence between the original image samples I and the corresponding samples of the watermarked image $W^i$ to which the code word coefficients have been added.

Figure 3A:
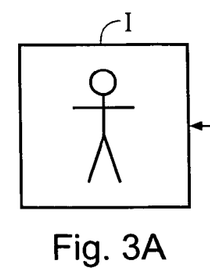
FIG. 3A is a representation of an original image.
Figure 3B:
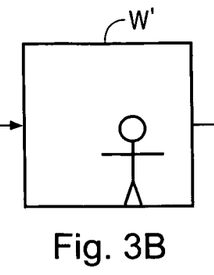
FIG. 3B is a representation of a marked image and FIG. 3C is the marked image after registration.
Figure 3C:
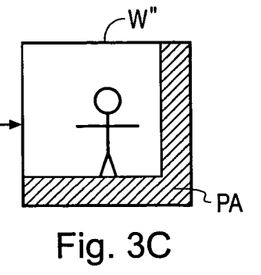

The effects of the registration are illustrated in FIG. 3. In FIG. 3 an example of the original image I is shown with respect to an offending marked version of the image W' As illustrated in FIG. 3, the watermarked image W' is offset with respect to the original image I and this may be due to the relative aspect view of the camera from which the offending version of the watermarked image was produced.

In order to recover a representation of the code word coefficients, the correct samples of the original image should be subtracted from the corresponding samples of the marked offending image. To this end, the two images are aligned. As shown in FIG. 3, the registered image W" has a peripheral area PA which includes parts which were not present in the original image.

As will be appreciated in other embodiments, the registration processor 30 may not be used because the offending image W' may be already substantially aligned to the originally version of the image I, such as, for example, if the offending version was downloaded via the Internet. Accordingly, the detecting image processor is provided with an alternative channel 32, which communicates the marked image directly to the recovery processor 40.

The registered image W" is received by a recovery processor 40. The recovery processor 40 also receives a copy of the original image I via a second channel 44. The registered image W" and the original image I are transformed by a DCT transform processor 46 into the DCT domain. An estimated code word X' is then formed by subtracting the samples of the DCT domain marked image V' from the DCT domain samples of the original image V as expressed by the following equations:

$$X' = V' - V$$
$$= v'_1 - v_1, v'_2 - v_2, v'_3 - v_3, v'_4 - v_4, \ldots, v'_n - v_n,$$
$$= x'_1, x'_2, x'_3, x'_4, \ldots x'_n$$

The output of the recovery processor 40 therefore provides on a connecting channel 50 an estimate of the coefficients of the code word which is to be identified. The recovered code word X' is then fed to a first input of a correlator 52. The correlator 52 also receives on a second input the regenerated code words $X^i$ produced by the code word generator 54. The code word generator 54 operates in the same way as the code word generator 8 which produces all possible code words of the set, using the predetermined seeds which identify uniquely the code words from a store 58.

The correlator 52 forms n similarity sim(i) values. In one embodiment, the similarity value is produced by forming a correlation in accordance with following equation:

$$sim(i) = \frac{X^i \cdot X'}{\sqrt{X^i \cdot X'}} = \frac{x_1^i \cdot x'_1 + x_2^i \cdot x'_2 + x_3^i \cdot x'_3 + \ldots + x_n^i \cdot x'_n}{\sqrt{x_1^i \cdot x'_1 + x_2^i \cdot x'_2 + x_3^i \cdot x'_3 + \ldots + x_n^i \cdot x'}}$$

Figure 4:
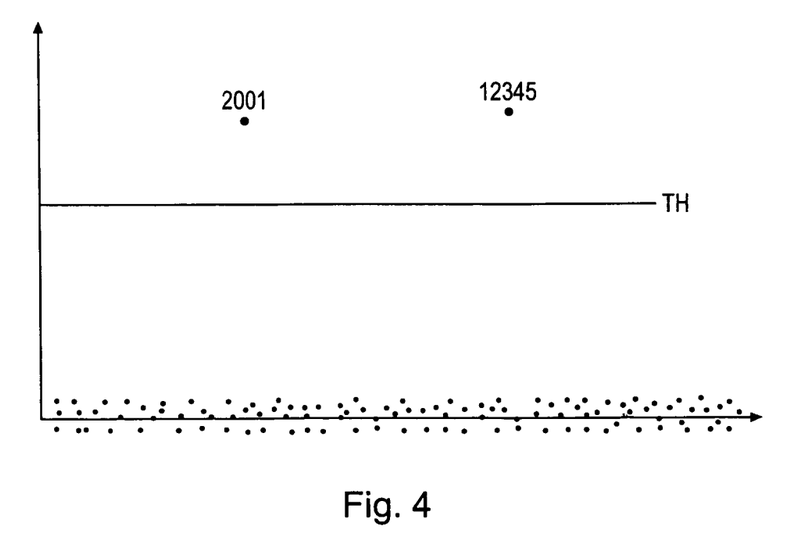
FIG. 4 is a graphical representation of an example correlation result for each of a set of N code words.

Each of the n similarity values sim(i) is then fed to a detector 60. The detector 60 then analyses the similarity values sim(i) produced for each of the n possible code words. As an example, the similarity values produced by the correlator 52 are shown in FIG. 4 with respect to a threshold TH for each of the possible code words. As shown in FIG. 4, two code words are above the threshold, 2001, 12345. As such, the detecting processor concludes that the watermarked version associated with code word 2001 and code word 12345 must have colluded in order to form the offending image. Therefore, in accordance with a false positive detection probability, determined from the population size, which in this case is 10 million and the watermarking strength α, the height of the threshold TH can be set in order to guarantee the false detection probability. As in the example in FIG. 4, if the similarity values produced by the correlator 52 exceed the threshold then, with this false positive probability, the recipients of the marked image are considered to have colluded to form the offending watermarked version of the image $W^i$.

The following sections illustrate advantages and features of the operation of the watermarking system illustrated in FIGS. 1 and 2.

Registration

The process of aligning the offending marked version of the image with the copy of the original image comprises correlating the samples of the original image with respect to the marked image. The correlation is performed for different shifts of the respective samples of the images. This is illustrated in FIG. 5.

Figure 5A:
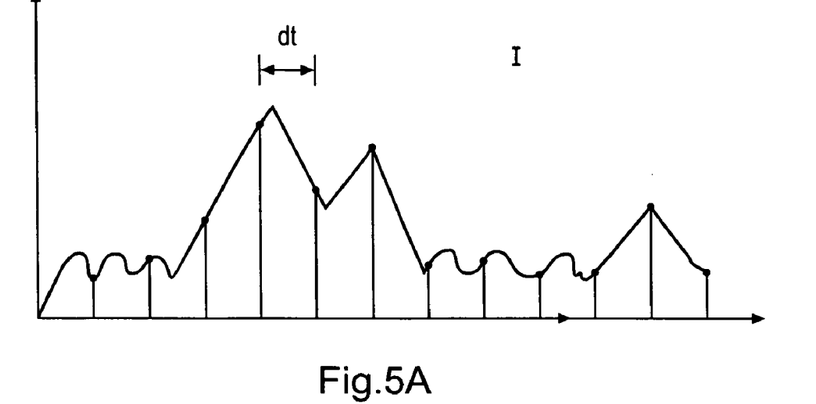
FIG. 5A is a graphical representation of samples of the original image I.
Figure 5B:
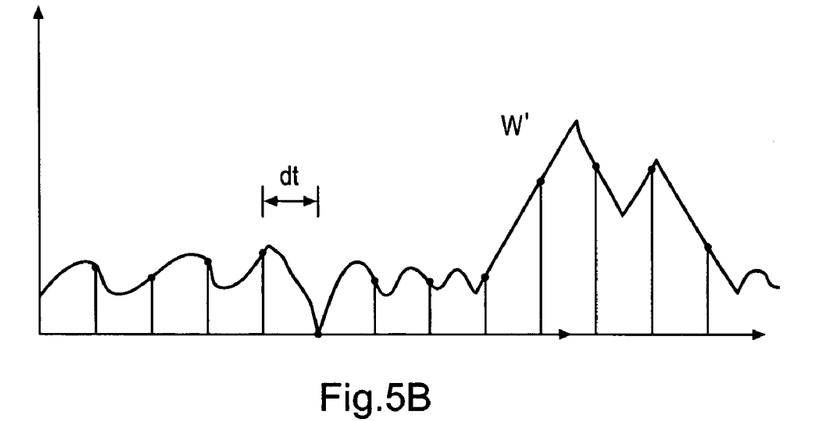
FIG. 5B is a graphical representation of samples of the watermarked image W'.

FIG. 5A provides an illustration of discrete samples of the original image I, whereas FIG. 5B provides an illustration of discrete samples of the offending watermarked image W'. As illustrated in the FIGS. 5A and 5B, the sampling rate provides a temporal difference between samples of dt. A result of shifting each of the sets of samples from the images and correlating the discrete samples is illustrated in FIG. 5C.

Figure 5C:
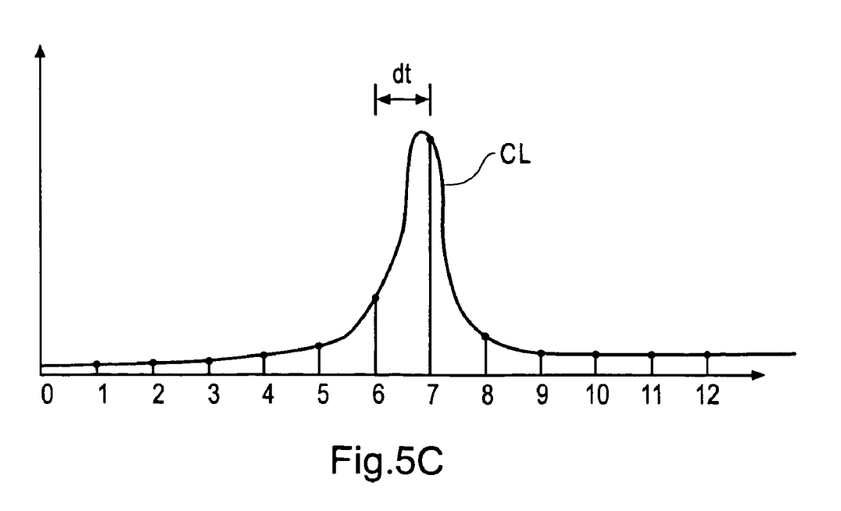
FIG. 5C is a graphical representation of correlation results for the original image and the watermarked image with respect to discrete sample shifts.

As shown in FIG. 5C, for a shift of between 6 and 7 samples, the correlation peak is highest. The offending watermarked image is therefore shifted by this amount with respect to the original image to perform registration.

Perceptibility Sensitive Encoding

Figure 6:
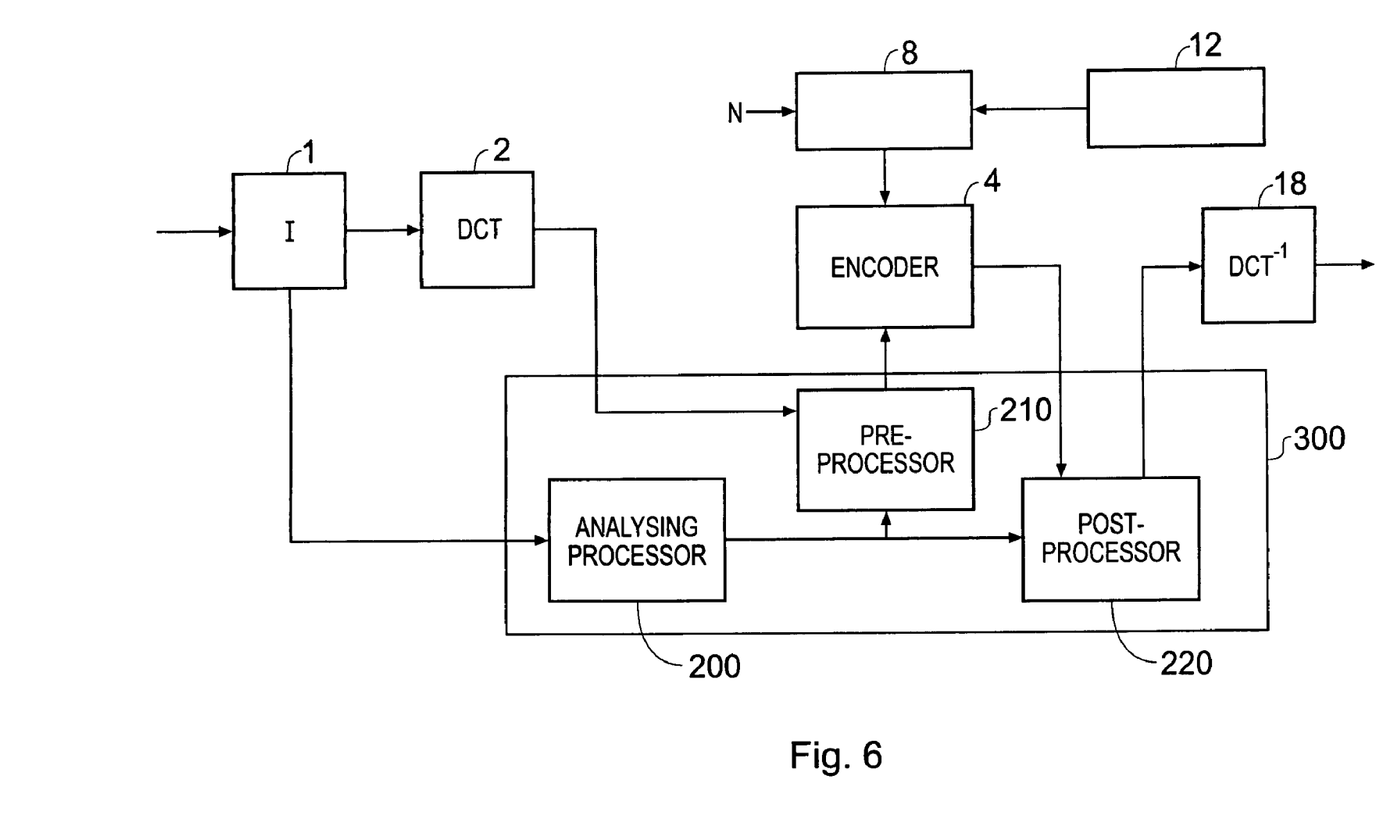
FIG. 6 is a schematic block diagram of an encoding data processing apparatus according to an embodiment of the invention.

An improved form of encoding image processing apparatus in accordance with embodiments of the present invention is shown in FIG. 6. FIG. 6 corresponds substantially to the encoding image processing apparatus shown in FIG. 1 where like parts have the same numerical designations. The embodiments of the invention are provided with an improved facility for adapting the strength of the watermark code word added to an image in accordance with a relative sensitivity of the image samples to the code word coefficients. As a result a likelihood of detecting a watermark code word from the image is improved. Conversely, the strength of the watermark code words can be adapted to a minimum to reduce a likelihood of the watermark code words being perceived in the marked image copy whilst maintaining a predetermined false negative detection probability.

The encoding processor shown in FIG. 6 includes an adaptation processor 300, which includes an analysing processor 200, a pre-processor 210 and a post processor 220.

Encoding with Perceptibility Mapping Value

A first example embodiment adapts the strength of the water mark code word coefficient in accordance with a perceptibility mapping value determined in accordance with a relative standard deviation of parts of the image. As with the encoding processor shown in FIG. 1, an image to be watermarked is received from a source and stored in the frame store 1. The image is then received by a DCT processor 2 and transformed to the discrete cosine domain. The image is also received from the frame store 1 by the analysing processor 200.

The encoding processor shown in FIG. 6 is provided with an improved arrangement for reducing the likelihood that a watermark will be perceivable in the watermarked image. That is to say, the likelihood of a difference between the watermarked image and the original image being detected by the human eye is substantially is reduced. To this end, the analysing processor is operable to calculate the standard deviation of the samples in each of the rows and columns of each block into which the image is divided.

Before forming the discrete cosine transform of the image, the image is divided into 8×8 pixel blocks. In the example embodiment, the code word coefficients are arranged to be introduced into the luminance samples of the image. The luminance signal samples may be derived from the image pixels in accordance with known techniques. For the present example embodiment the luminance signal samples are analysed to determine a relative sensitivity of the block to carry the watermark code word coefficients. The relative sensitivity is determined in accordance with a property of the samples to carry the code word coefficients. The relative sensitivity is determined with respect to the standard deviation of the luminance samples within each block.

Figure 7:
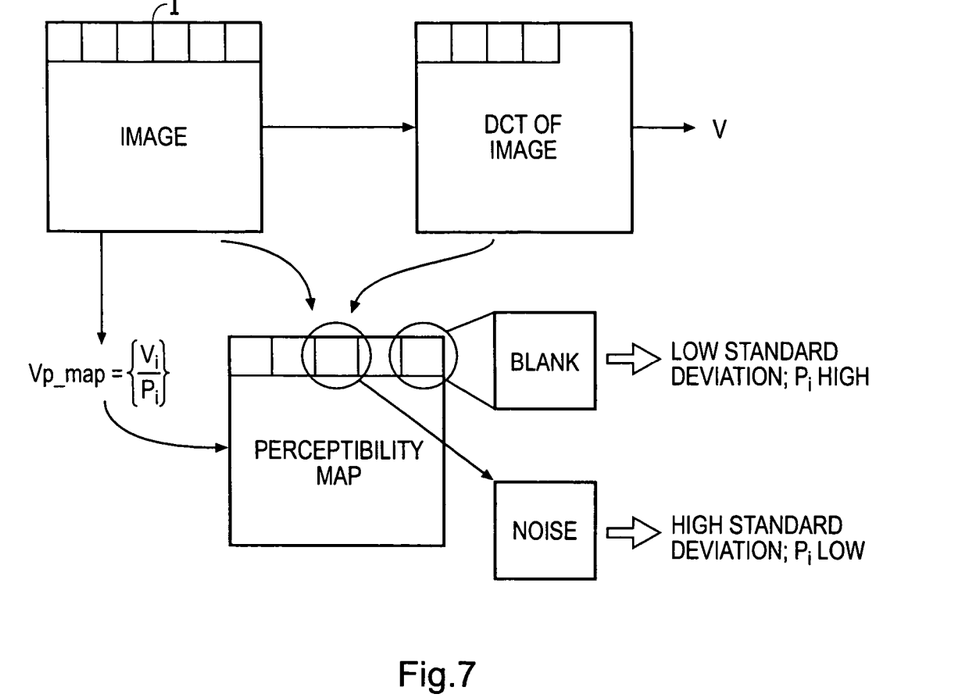
FIG. 7 is a schematic representation of the operation of the encoding data processor according to a first example.

For each block, a minimum of the standard deviation of the luminance samples for each row and column is determined. The value of the standard deviation is then bounded to a pre-determined scale, for example, to a scale value between 1 and 10. According to, for example, a linear mapping, for a high relative standard deviation a perceptibility mapping value $p_i$ is set to a low value 1, whereas for a low relative standard deviation the perceptibility mapping value is set to a high value, for example 10. The calculation of the mapping value with respect to the standard deviation of the image blocks is represented in FIG. 7. As shown in FIG. 7, from each of the DCT coefficients, which form sample values to which the code word coefficients are added, a new sample value is generated $V_{P\_MAP}$. This new sample value is generated by dividing the original sample value of the DCT coefficients by the perceptibility mapping value $p_i$. Therefore as shown in FIG. 6, the analysing processor 200 generates the perceptibility mapping values in accordance with standard deviation bounded to a pre-determined scale of 1 to 10.

The perceptibility mapping value for each 8×8 pixel block is fed to the pre-processors 210 and the post-processor 220. The pre-processor 210 is operable to divide the corresponding DCT coefficient $v_i$ by the perceptibility mapping $p_i$ value according to the following equation:

$$v_{p\_map}(i) = \left\{ \frac{v_i}{p_i} \right\}$$

The encoder then operates as before by adding the code word coefficient to each new DCT coefficient value.

Following the encoder 4, the post-processor 220 receives the perceptibility mapping values $p^i$ and is arranged to multiply each of the DCT coefficients by the perceptibility mapping value. This is expressed by the equation below:

$$v_i' = (v_{p\_map}(i) + x_i)p_i = v_{p\_map}(i)p_i + x_i p_i = v_i + x_i p_i$$

Figure 8:
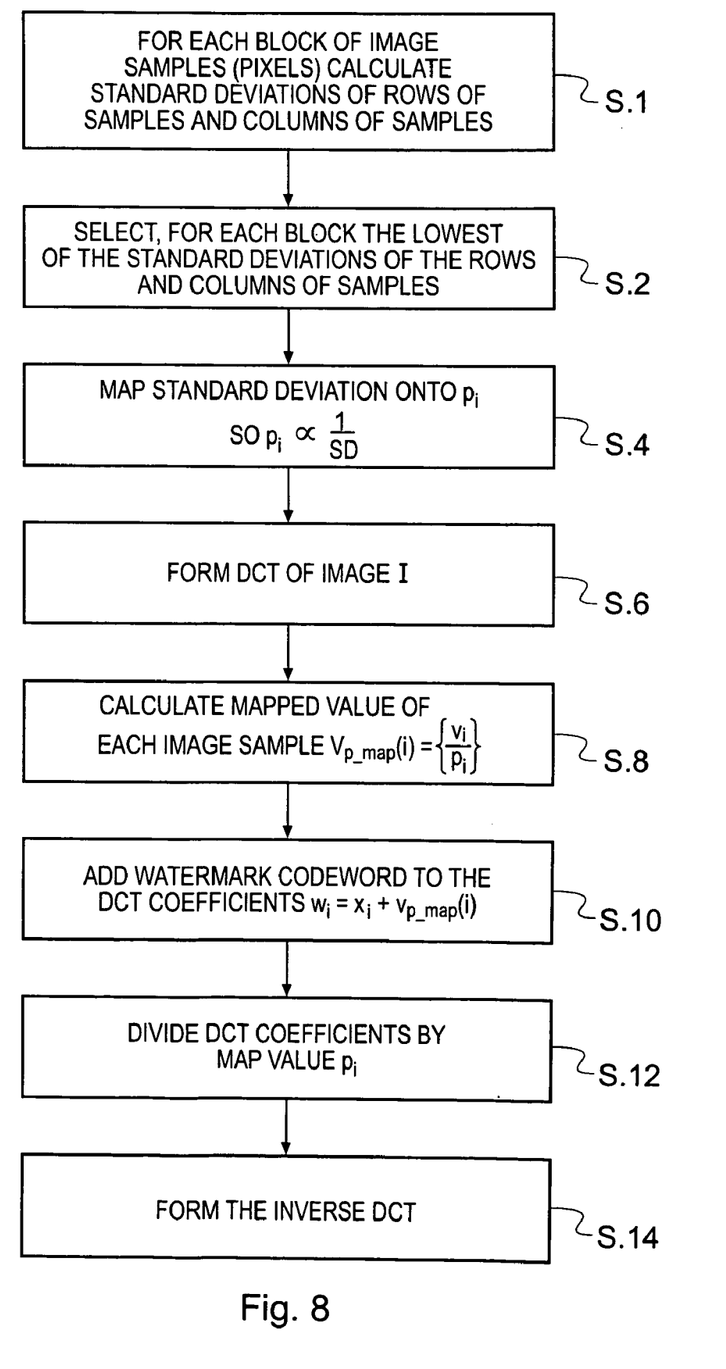
FIG. 8 is a flow diagram representing the operation of the encoding data processing apparatus according to the first example.

This has an effect of returning the DCT coefficient values to their original value. However, the corresponding scaled value for the code word coefficient is proportional to the perceptibility mapping value $p_i$. As such, for an image block having a low standard deviation the relative strength of the code word coefficients is low, thus reducing the likelihood of the code word being perceptible in the watermarked image. If the image block has a high standard deviation, then correspondingly the code word coefficient strength is set to a high value, because for a high standard deviation, the likelihood of the code word being perceptible in the watermarked image is proportionally lower. As such, the strength of the watermark can be adapted in accordance with the relative ability of the image samples to carry the code word coefficients. Thus the likelihood of the code word being detected by the detecting image processor is improved and correspondingly the likelihood of the code word being noticed in the marked image is reduced. The process of adapting the strength of the watermark coefficients in accordance with the ability of the samples to carry the coefficients performed by the encoding apparatus of FIG. 1 is shown in FIG. 8.

In another alternative embodiment, a scaling factor is calculated for each of the blocks of the image, which is proportional to the standard deviation of the image block. Conversely the image samples after watermark encoding are then divided by the scaling factor, the scaling factor being less than one.

Encoding Strength Mapping Function

Figure 9:
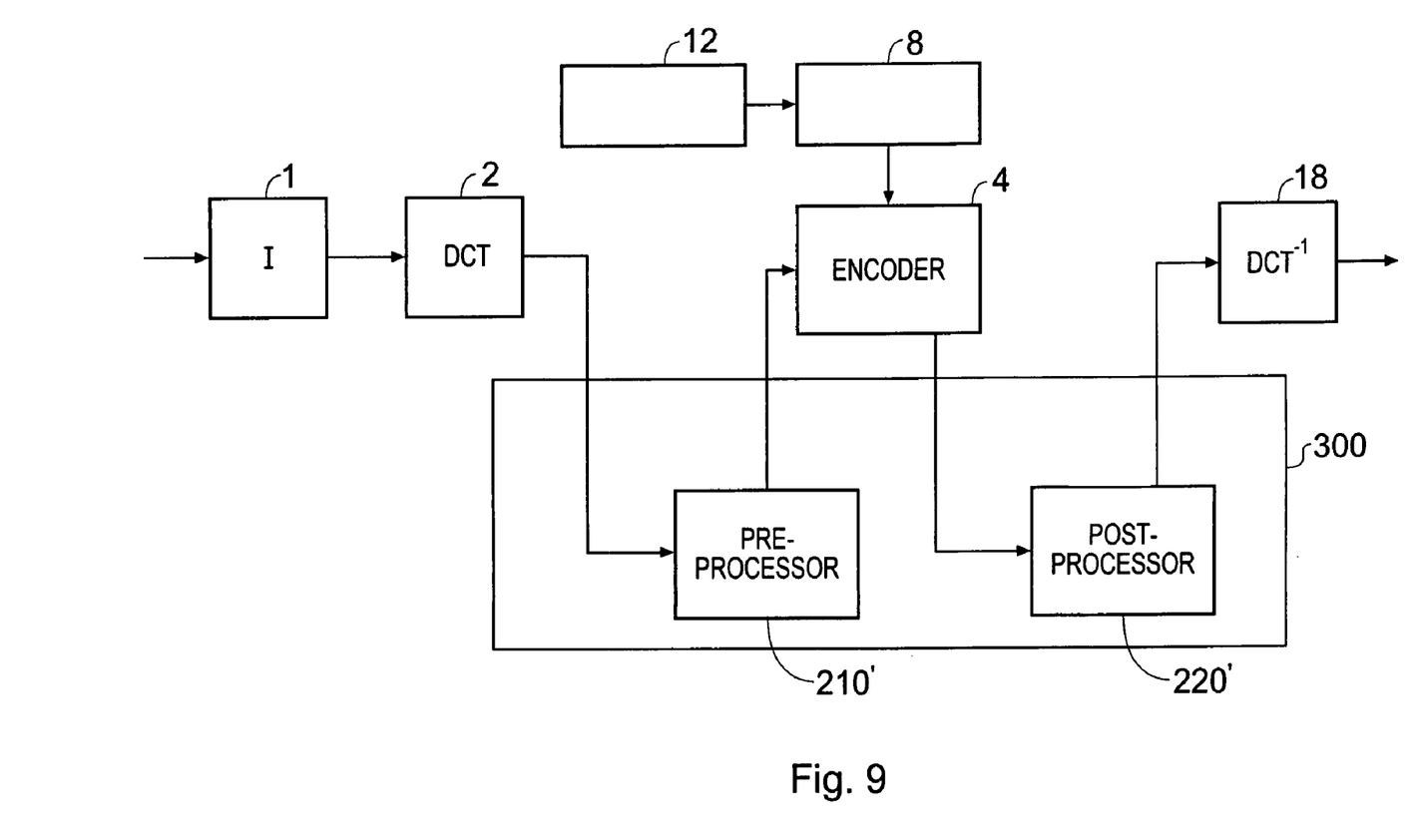
FIG. 9 is a schematic block diagram of an encoding data processing apparatus embodying the present invention and illustrating a second example operation.

A further example embodiment which provides a facility for matching the strength of the code word coefficients when added to the image in accordance with the relative sensitivity of the samples of the image to carry the coefficients is illustrated in FIG. 9.

Figure 10:
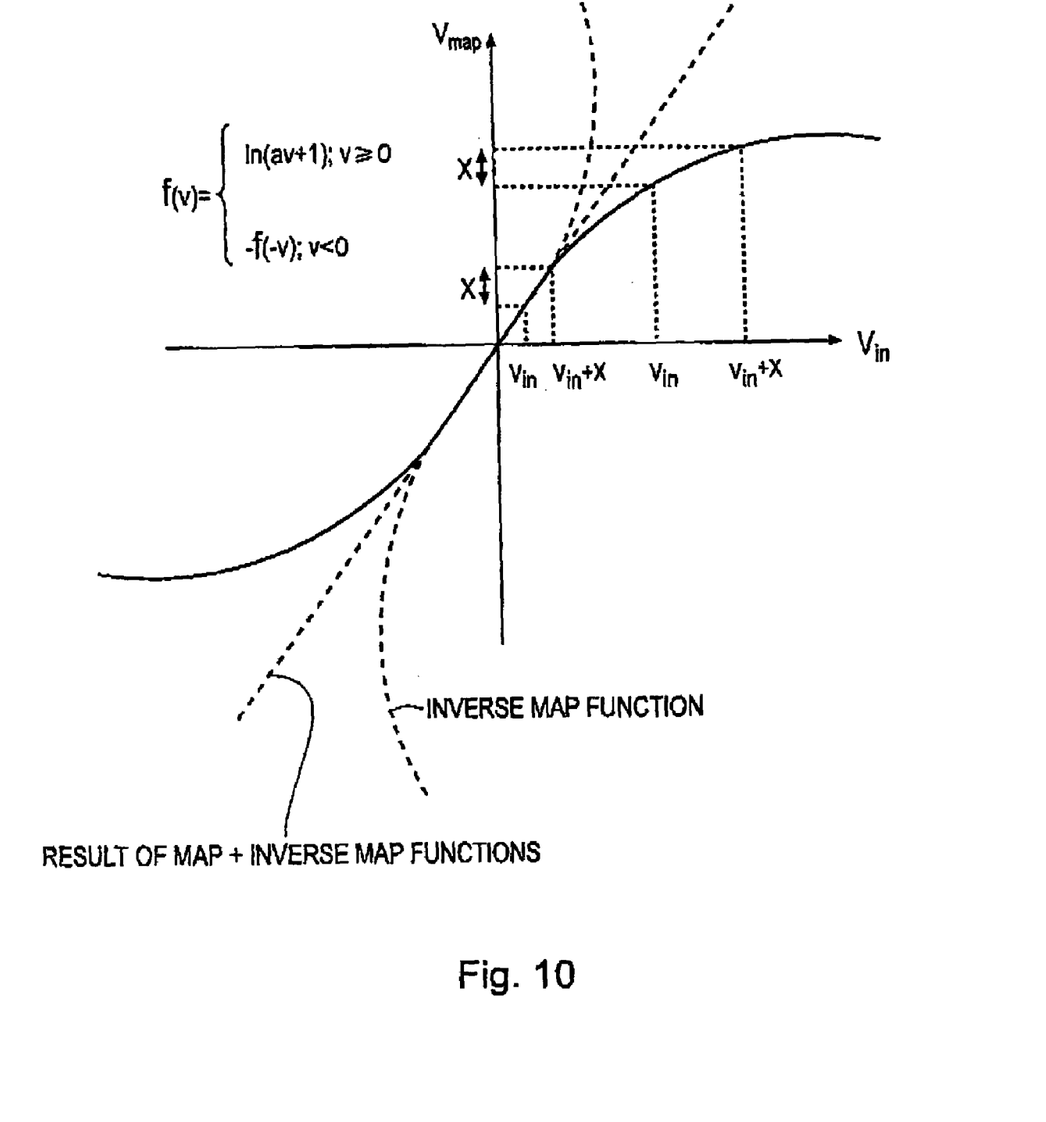
FIG. 10 is a graphical representation of a mapping function used in the second example.

FIG. 9 corresponds substantially to the encoding image processor shown in FIG. 6 except that the analysing processor 200 is not required. In the embodiment shown in FIG. 9, the pre-processor 210' operates to map the DCT coefficients in accordance with an input/output function represented by the curve in FIG. 10. The curve shown in FIG. 10 has an effect of increasing strength of the code word coefficients of the watermark in accordance with the relative strength of the DCT coefficients to which the code word coefficients are added. Accordingly, the pre-processor generates a mapped version of the DCT coefficients by generating the output value in accordance with the input DCT coefficients as shown in FIG. 10. The mapping function of the curve shown in FIG. 10 may be expressed mathematically as follows:

$$v_{map} = f(v)$$

$$f(v) = \begin{cases} \ln(av+1), & v \geq 0 \\ -f(-v), & v < 0 \end{cases}$$

Effectively, the mapping function has an effect of compressing the mapped value of the DCT coefficients at an upper end of the higher values of the DCT coefficients.

The post-processor 220' operates to reverse the compression curve shown in FIG. 10 to the effect that there is linear correspondence between the DCT coefficients generated by the DCT transform processor 2 and the DCT coefficients generated at the output of the post-processor 220' after the watermark code word has been added to the DCT domain image. As a result, the post-processor 220' has an effect of expanding again the range of the DCT coefficient values. Correspondingly, this expansion has an effect of increasing the value of the code word coefficients. Accordingly, it will be appreciated that the strength of the code word coefficients is matched to the relative strength of the DCT coefficients, with the effect that a likelihood of the code word being perceived in the spatial domain image is substantially reduced. Correspondingly, the strength of the code word coefficients can be increased in accordance with the relative ability of the DCT coefficients of the image to hide the code word coefficients.

In some embodiments the sets of code words generated by the code word generator are derived by cyclically shifting a base code word generated from a particular seed. For this example embodiment the order of the DCT coefficients may permuted in accordance with a permutation code, which remains secret but known to the detecting data processor. The permutation reduces a likelihood of a successful collusion attack.

Figure 11:
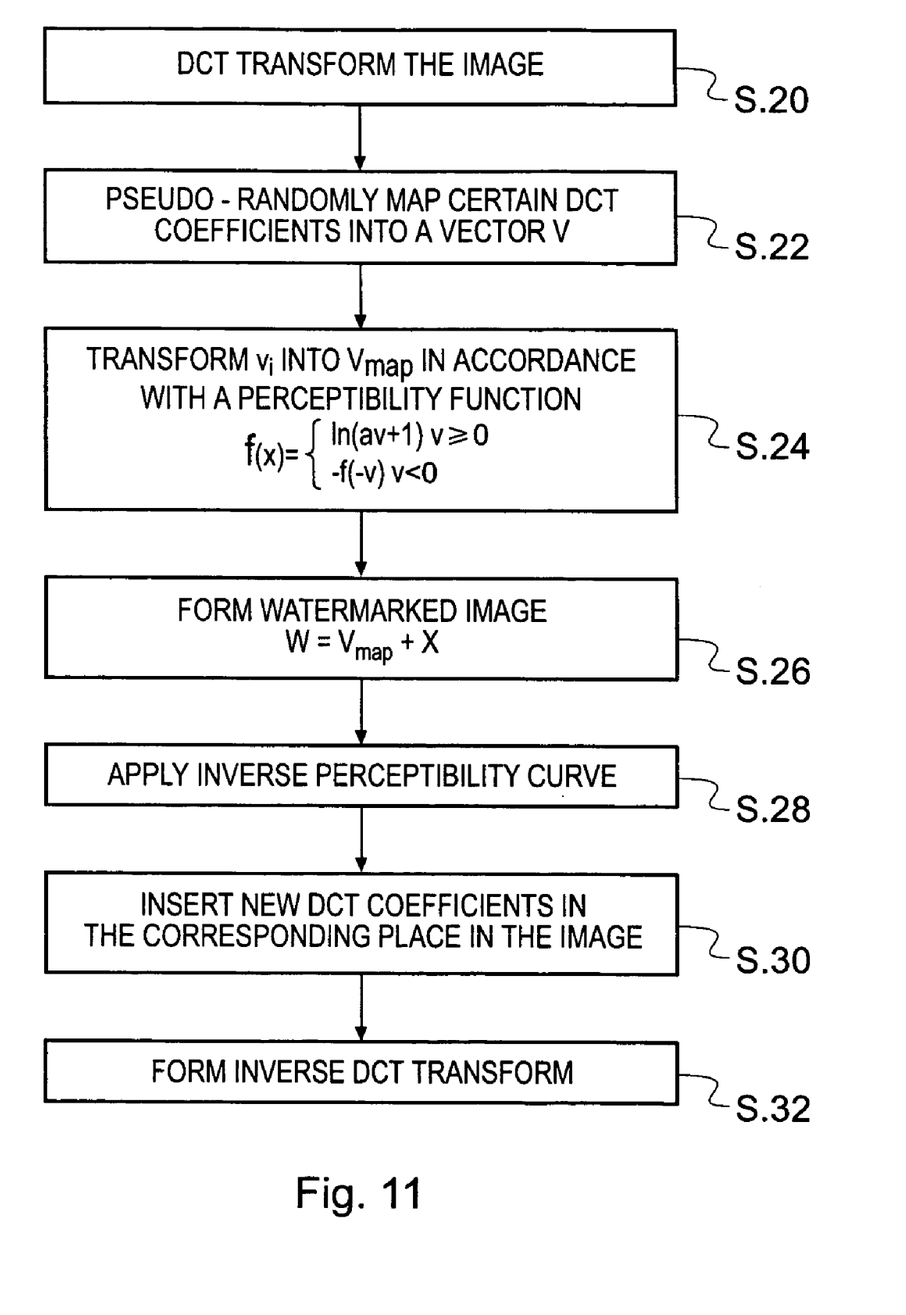
FIG. 11 is a flow diagram representing the operation of the encoding data processing apparatus according to the second example.

A flow diagram reflecting the order of operations for mapping the DCT coefficients for perceptible sensitive encoding and for introducing the random ordering is shown in FIG. 11.

Other Applications

In addition to the above-mentioned applications of the encoding data processing apparatus of the watermarking system to a cinema projector and to a web server, other applications are envisaged. For example, a receiver/decoder is envisaged in which received signals are watermarked by introducing code words upon receipt of the signals from a communicating device. For example, a set top box is typically arranged to receive television and video signals from a "head-end" broadcast or multi-cast device. As will be appreciated in this application, the encoding data processing apparatus forms part of the set top box and is arranged to introduce watermark code words into the video signals as the signals are received and decoded. In one example embodiment, the watermark code word is arranged to uniquely identify the set top box which receives and decodes the video signals.

In a further embodiment a digital cinema receiver is arranged to receive a digital cinema film via a satellite. The receiver is arranged to receive signals representing the digital cinema film and to decode the signals for reproduction. The receiver includes an encoding data processing apparatus, which introduces a watermark code word into the decoded film signals. The watermark code word is provided, for example, to uniquely identify the cinema receiving the film signals.

A further example embodiment may comprise a digital camera or camcorder or the like which includes a memory and a memory controller. An encoding data processing apparatus according to an embodiment of the present invention is arranged to introduce a watermark code word stored in the memory into video signals captured by the camera. According to this embodiment, the encoding data processing apparatus does not include a code word generator because the code word is pre-stored in the memory. Under the control of the memory controller the code word stored in the memory is embedded into the video signals, uniquely or quasi-uniquely identifying the video signals.

In a further embodiment, an encoding data processing apparatus according to an embodiment of the invention is operable to encode a sequence of watermark code words into different frames of digital images forming a continuous or moving picture. The code words may be related to one another and may be used to identify each of the images separately.

Various further aspects and features of the present invention are defined in the appended claims. Various modifications can be made to the embodiments herein before described without departing from the scope of the present invention.

The invention claimed is:

1. An encoding data processing apparatus for generating at least one marked copy of an original item of material by introducing one of a predetermined set of code words into a copy of said material item, said code word comprising a plurality of coefficients formed from one of pseudo-randomly and randomly distributed numbers, said apparatus comprising:

a code word generator configured to provide said code word having said plurality of code word coefficients, an encoder processor configured to combine the code word coefficients with said material item, and an adaptation processor including a pre-processor configured to adapt the magnitude of the material item samples in accordance with a mapping function before the code word coefficients are combined with the material item samples, and a post-processor coupled to the encoder and configured to adapt the magnitude of the material item samples with which said code word coefficients have been combined in accordance with an inverse mapping function, the adaptation of the material item samples before and after said code word coefficients are combined therewith being arranged to adapt the strength of said code word coefficients with respect to said material item samples in accordance with a relative sensitivity of said material item samples to carry said code word coefficients, said inverse mapping function being complementary to the mapping function performed by the post-processor, wherein said mapping function provides a non-linear relationship between the magnitude of the material signal samples received and the adapted magnitude of the material signal samples.

2. An encoding data processing apparatus as claimed in claim 1, wherein said relative sensitivity of said material item samples is determined in accordance with a relative magnitude of said material item samples.

3. An encoding data processing apparatus as claimed in claim 1, wherein said adaptation processor is operable to increase the strength of the watermark code word coefficients in proportion with the relative magnitude of the material item samples.

4. An encoding data processing apparatus as claimed in claim 1, wherein said mapping function has an effect of compressing the magnitude of material item samples with a higher relative magnitude with respect to material item samples having a lower relative magnitude, and said inverse mapping function has an effect of expanding the magnitude of material item samples with a higher relative magnitude with respect to material item samples having a lower relative magnitude to complement said mapping function, the mapping and inverse mapping having an effect of adapting the strength of the watermark code word coefficients in accordance with a relative sensitivity of said material item samples to carry said code word coefficients.

5. An encoding data processing apparatus as claimed in claim 1, comprising:

a discrete cosine transform processor operable to transform said material item into the discrete cosine transform domain, said material item in said discrete cosine transform domain being represented as a plurality of discrete cosine transform coefficients, said encoder being operable to combine said code word with said material item by adding each of said code word coefficients to a corresponding one of said discrete cosine transform coefficients, and an inverse discrete cosine transform processor operable to form said marked copy of said material item by performing an inverse discrete cosine transform on said discrete cosine transformed image to which said code word has been added by said encoder processor, wherein said adaptation processor is operable to adapt the strength of the watermark code word coefficients or the discrete cosine transform coefficients in accordance with a relative sensitivity of said discrete cosine transform coefficients to carry said code word coefficients.

6. An encoding data processing apparatus as claimed in claim 1, wherein said relative sensitivity is determined in accordance with a relative standard deviation of the magnitude of the material item samples.

7. An encoding data processing apparatus as claimed in claim 6, wherein said adaptation processor is operable to increase the strength of the watermark code word coefficients in proportion with the relative standard deviation of the magnitude of the material item samples.

8. An encoding data processing apparatus as claimed in claim 5, wherein
the pre-processor is operable to generate a mapping value bounded by a predetermined range, which is inversely proportional to said relative standard deviation of the magnitude of said material item samples, and to adapt said signal samples by dividing said signal samples by said mapping value, and
the post-processor is operable to adapt said magnitude of said material item samples by scaling said encoded samples by said mapping value.

9. An encoding data processing apparatus as claimed in claim 5, wherein
the pre-processor is operable to generate a scaling factor having a predetermined range in proportion to said standard deviation and to adapt the magnitude of said material item samples by scaling said samples by said scaling factor, and
the post-processor is operable to adapt said magnitude of said material item samples by dividing said encoded samples by said scaling factor.

10. An encoding data processing apparatus as claimed in claim 6, wherein said material item is an image and said adaptation processor includes an analysing processor operable to determine the standard deviation of each of the rows of image samples and the columns of the image samples, and to determine said relative standard deviation in accordance with the lowest of said standard deviation of the rows and columns of said image samples, said relative standard deviations indicating the sensitivity of said image to carry said watermark code word coefficients.

11. An encoding data processing apparatus as claimed in claim 10, wherein said analysing processor is operable to divide said image into blocks having a predetermined size, said relative standard deviation being determined for each of said blocks and said adaptation processor adapting one of the strength of said code word coefficients or said material item samples in accordance with said relative standard deviation determined for each block separately.

12. An encoding data processing apparatus as claimed claim 6, comprising
a discrete cosine transform processor operable to transform said material item into the discrete cosine transform domain, said material item in said discrete cosine transform domain being represented as a plurality of discrete cosine transform coefficients, said encoder being operable to combine said code word with said material item by adding each of said code word coefficients to a corresponding one of said discrete cosine transform coefficients, and
an inverse discrete cosine transform processor operable to form said marked copy of said material item by performing an inverse discrete cosine transform on said discrete cosine transformed image to which said code word has been added by said encoder processor, wherein said adaptation processor is operable to adapt the strength of the watermark code word coefficients or the discrete cosine transform coefficients in accordance with a relative sensitivity of said discrete cosine transform coefficients to carry said code word coefficients.

13. A detecting data processing apparatus operable to identify at least one of a plurality of code words present in a marked version of a material item produced by the encoding data processing apparatus claimed in claim 1, said detecting apparatus comprising
a decoding processor operable to generate a recovered code word from said marked material item, and
a detection processor operable to generate a correlation value for each code word in the set by correlating the recovered code word with respect to each regenerated code word of the set, and detecting at least one code word for the correlation value of the regenerated code word exceeding a predetermined correlation threshold, wherein the variance of the values of the regenerated code word coefficients is arranged to be substantially unity.

14. A detecting data processing apparatus as claimed in claim 13, wherein said decoding processor is operable to generate said recovered code word by subtracting corresponding samples of said original material version from said samples of said marked material version, and to generate, for each of said plurality of code words a correlation sum by correlating the recovered code word with each of the plurality of code words.

15. A cinema projector including an encoding data processing apparatus according to claim 1, wherein said data processing apparatus is operable to receive at least one of audio signals and image signals before reproduction, and to introduce a code word into said at least one of audio signals and image signals before reproduction.

16. A web server operable to provide material items for downloading via the Internet, said web server including an encoding data processing apparatus according to claim 1, wherein said data processing apparatus is operable to receive material items and to introduce a code word into said material items before said material items are downloaded.

17. A method of generating at least one marked version of an original item of material by introducing one of a predetermined set of code words into a copy of said original material item, said method comprising,
forming said code word by generating a plurality of code word coefficients, and
combining the code word coefficients with said material item, wherein said forming said code word includes
adapting, in accordance with a mapping function, the magnitude of the material item samples before the code word coefficients are combined with the material item samples, and
adapting, in accordance with an inverse mapping function, the magnitude of the material item samples with which said code word coefficients have been combined, the adaptation of the material item samples before and after said code word coefficients are combined therewith being arranged to adapt the strength of said code word coefficients with respect to said material item samples in accordance with a relative sensitivity of said material item samples to carry said code word coefficients, said inverse mapping function being complementary to the mapping function, wherein said mapping function provides a non-linear relationship between the magnitude of the material signal samples received and the adapted magnitude of the material signal samples.

18. A method of identifying one or more of a predetermined set of code words present in a marked version of an original material item, said marked version having been formed by combining each of a plurality of samples of a copy of said original material item with one of a corresponding plurality of code word coefficients according to claim 17, said method comprising
generating a recovered code word from said marked material item, and
generating a correlation value for each code word in the set by
correlating the recovered code word with respect to each regenerated code word of the set, and
detecting at least one code word for the correlation value of the regenerated code word exceeding a predetermined correlation threshold, wherein the variance of the values of the regenerated code word coefficients is arranged to be substantially unity.

19. A computer program product providing computer executable instructions stored on a computer-readable medium, which when loaded onto a data processor configures the data processor to operate as the encoding data processing apparatus according to claim 1.

20. A computer program product providing computer executable instructions stored on a computer-readable medium, which when loaded onto a data processor configures the data processor to operate as the detecting data processor according to claim 13.

21. A computer program product providing computer executable instructions stored on a computer-readable medium, which when loaded on to a data processor causes the data processor to perform the method according to claim 17.

22. A computer program product providing computer executable instructions stored on a computer-readable medium, which when loaded on to a data processor causes the data processor to perform the method according to claim 18.

23. A receiver operable to receive signals representative of material items, comprising
an encoding data processing apparatus according to claim 1 operable to combine at least one code word with the received signals, said code word being provided to identify uniquely said received signals.

24. An encoding data processing apparatus for generating at least one marked version of an original item of material by introducing one of a predetermined set of code words into a copy of said original material item, said apparatus comprising:
means for forming said code word by generating a plurality of code word coefficients, and
means for combining the code word coefficients with said material item, wherein said means for forming said code word includes
means for adapting one of the strength of said code word coefficients or said material item samples in accordance with a relative sensitivity of said material item samples to carry said code word coefficients, said means for adapting including,
first means for adapting a magnitude of the material item samples in accordance with a mapping function before the code word coefficients are combined with the material item samples or for adapting the strength of said code word coefficients, and
second means for adapting a magnitude of the material item samples with which said code word coefficients have been combined in accordance with an inverse mapping function, said inverse mapping function being complementary to the mapping function,
wherein said mapping function provides a non-linear relationship between the magnitude of the material signal samples received and the adapted magnitude of the material signal samples.

* * * * *